(12) United States Patent
Naiva et al.

(10) Patent No.: US 9,300,125 B2
(45) Date of Patent: Mar. 29, 2016

(54) APPARATUS FOR ENERGIZING A PROTECTIVE DEVICE, AND ASSOCIATED METHOD

(75) Inventors: Matthew Wilbur Naiva, Wauwatosa, WI (US); Mark Alan Verheyen, Whitefish Bay, WI (US); Joseph Daniel Riley, Grafton, WI (US)

(73) Assignee: EATON CORPORATION, Cleveland, OH (US)

( * ) Notice: Subject to any disclaimer, the term of this patent is extended or adjusted under 35 U.S.C. 154(b) by 1360 days.

(21) Appl. No.: 12/827,663

(22) Filed: Jun. 30, 2010

(65) Prior Publication Data
US 2012/0001764 A1 Jan. 5, 2012

(51) Int. Cl.
G08B 21/00 (2006.01)
H02H 3/04 (2006.01)
H02H 1/06 (2006.01)

(52) U.S. Cl.
CPC . *H02H 3/04* (2013.01); *H02H 1/066* (2013.01)

(58) Field of Classification Search
USPC ......... 340/644, 645, 646; 361/31, 94, 96, 160
See application file for complete search history.

(56) References Cited

U.S. PATENT DOCUMENTS

| 3,011,162 A | * | 11/1961 | Byrnes | 340/644 |
| 3,590,326 A | * | 6/1971 | Watson | 361/96 |
| 3,602,783 A | * | 8/1971 | Engle et al. | 361/96 |
| 3,634,729 A | * | 1/1972 | Hendry et al. | 361/96 |
| 3,638,072 A | * | 1/1972 | Kobayashi et al. | 361/93.6 |
| 3,666,994 A | * | 5/1972 | Watson et al. | 361/96 |
| 3,943,411 A | * | 3/1976 | Huszty et al. | 361/94 |
| 4,148,086 A | * | 4/1979 | Landa et al. | 361/37 |
| 4,223,306 A | * | 9/1980 | Reimer | 340/650 |
| 4,345,288 A | * | 8/1982 | Kampf et al. | 361/31 |
| 4,713,973 A | * | 12/1987 | Woyton | 73/862.628 |

(Continued)

FOREIGN PATENT DOCUMENTS

| JP | 11155237 A | * | 6/1999 | H02J 7/00 |
| JP | 2000-111122 A | | 4/2000 | |

OTHER PUBLICATIONS

State Intellectual Property Office of the People's Republic of China, "First Office Action for CN Application No. 201110222843.2" and English language translation, Jan. 23, 2015, 37 total pages.

*Primary Examiner* — Travis Hunnings
(74) *Attorney, Agent, or Firm* — Eckert Seamans Cherin & Mellott, LLC; Brij K. Agarwal; Philip E. Levy

(57) ABSTRACT

An improved overload relay includes a number of current transformers that draw power from a circuit it protects to power itself. The current transformers charge a capacitor which powers a processor and which can energize a solenoid to initiate the interruption of the circuit. The overload relay further includes a capacitor analysis circuit which detects an operational parameter of the capacitor and enables a processor to determine when the energy storage capability of the capacitor has dropped to a predetermined threshold. In the event of such a determination, the overload relay can perform any of a number of actions.

14 Claims, 2 Drawing Sheets

(56) References Cited

U.S. PATENT DOCUMENTS

| | | | |
|---|---|---|---|
| 5,313,628 A * | 5/1994 | Mendelsohn et al. | 714/3 |
| 5,448,766 A * | 9/1995 | Sanning et al. | 455/103 |
| 5,818,674 A * | 10/1998 | Zuzuly | 361/78 |
| 6,141,198 A * | 10/2000 | Zuzuly | 361/93.4 |
| 6,363,506 B1 * | 3/2002 | Karri et al. | 714/733 |
| 6,925,367 B2 * | 8/2005 | Fontius | 702/183 |
| 2002/0078403 A1 * | 6/2002 | Gullo et al. | 714/37 |
| 2002/0082896 A1 * | 6/2002 | Inagi | 705/9 |
| 2004/0033799 A1 * | 2/2004 | Fontius | 455/423 |
| 2005/0244169 A1 * | 11/2005 | Ono | 399/12 |
| 2006/0192993 A1 * | 8/2006 | Omotani | 358/1.15 |
| 2012/0092797 A1 * | 4/2012 | Reeder et al. | 361/31 |

\* cited by examiner

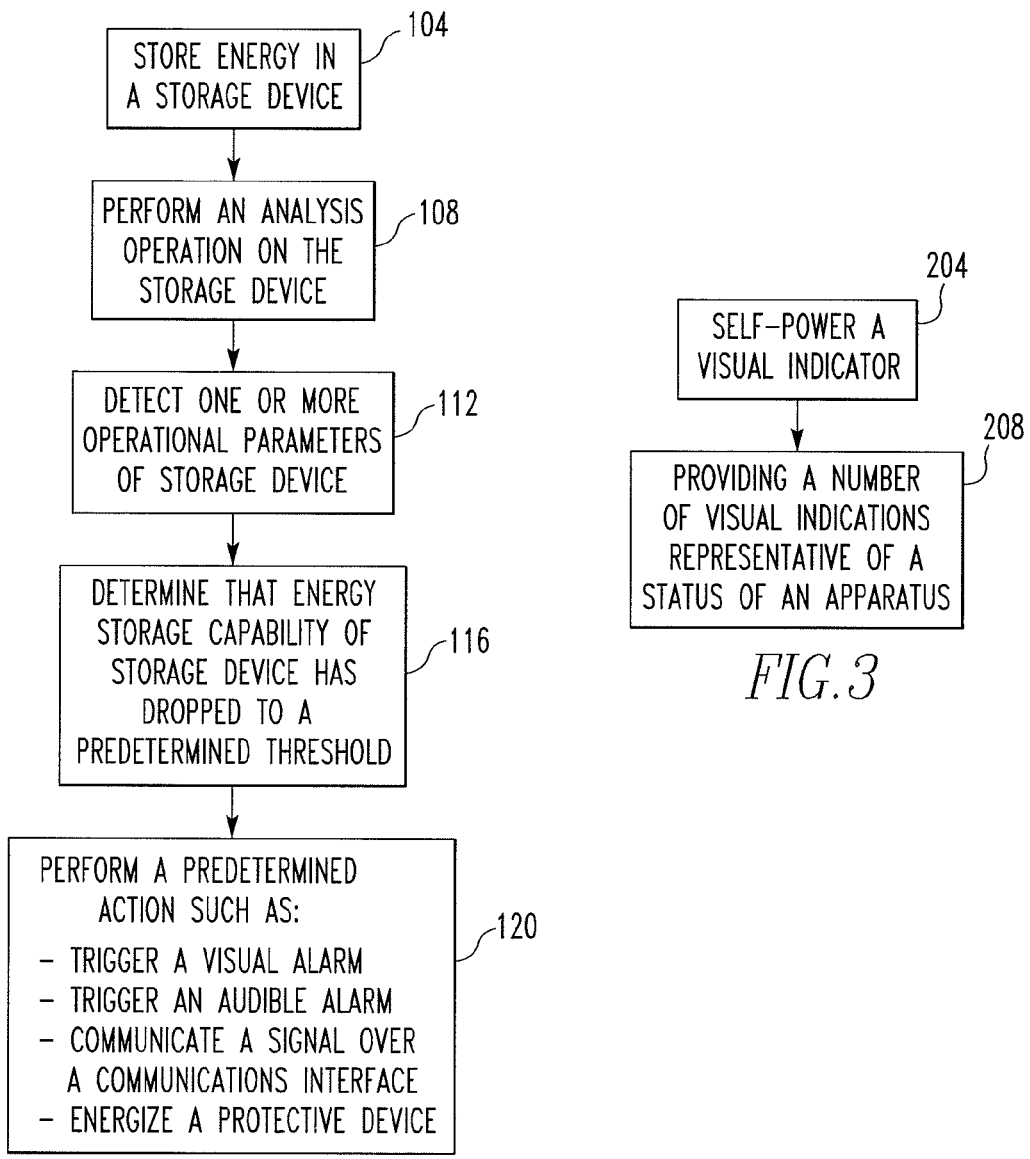

APPARATUS FOR ENERGIZING A PROTECTIVE DEVICE, AND ASSOCIATED METHOD

BACKGROUND

1. Field

The disclosed and claimed concept relates generally to an apparatus that is configured to energize a protective device to open at least a portion of a circuit and, more particularly, to an apparatus that performs a predetermined action when its ability to initiate the opening of the circuit has dropped to a predetermined threshold.

2. Description of the Related Art

Numerous types of circuit interrupters are known. One type of circuit interrupter is in the form of a relay that includes an current measurement circuit that employs various algorithms to determine when to disconnect the power to a large load, such as a motor, in certain predefined overload scenarios. Such circuit interrupters may include an energy storage device such as an electrolytic capacitor to energize a solenoid of a relay which causes another solenoid to change state to cause a contactor to interrupt the circuit. While such circuit interrupters have generally been effective for their intended purposes, such circuit interrupters have not been without limitation.

As is generally understood, the energy storage capability of an electrolytic capacitor can degrade over time, and elevated temperatures can accelerate such degradation. Depending upon the degree of degradation, such a capacitor may store an insufficient amount of energy to energize the solenoid that initiates the opening of the circuit. Moreover, while certain overload conditions can occur in an extremely short period of time, other overload conditions develop over several minutes or even hours, and it is generally undesirable for equipment to suddenly stop operating, whether because the power supply to the equipment has been interrupted or because the equipment has overheated or otherwise failed. It thus would be desirable to address these and other shortcomings known in the relevant art.

SUMMARY

Accordingly, an improved apparatus in the form of an overload relay includes a number of current transformers that draw power from a circuit it protects in order to evaluate the circuit and also to power itself. The current transformers charge a capacitor which powers a processor and which can energize a solenoid to toggle a normally CLOSED set of contacts to an OPEN condition to cause another solenoid to open a contactor to interrupt the circuit to a load. Advantageously, the overload relay further includes a capacitor analysis circuit which detects one or more operational parameters of the capacitor and enables a processor of the overload relay to determine when the energy storage capability of the capacitor has dropped to a predetermined threshold. In the event of such a determination, the overload relay can perform any of a number of predetermined actions, such as sending an indication that the overload relay or the capacitor itself should be replaced in a given period of time or by causing the capacitor to energize the solenoid to interrupt the circuit. The overload relay further advantageously includes a visual indicator that includes an LED that is able to provide a visual indication of a status of the overload relay.

Accordingly, an aspect of the disclosed and claimed concept is to provide an improved overload relay that is self-powered and that includes a visual indicator that provides an indication of a status of the overload relay.

Another aspect of the disclosed and claimed concept is to provide an improved overload relay that is configured to protect a circuit and that provides an indication of its potential inability to protect the circuit.

These and other aspects of the disclosed and claimed concept are provided by an improved apparatus that is structured to energize a protective device to at least initiate an opening of at least a portion of a circuit. The general nature of the apparatus can be stated as including a storage device structured to store energy and to release at least a portion of the energy to energize the protective device, a detection system connected with the storage device and structured to detect at least a first operational parameter of the storage device that is usable in determining an energy storage capability of the storage device and, responsive to a determination by the apparatus that the energy storage capability of the storage device has dropped to a predetermined threshold, the apparatus being structured to perform a predetermined action.

Still other aspects of the disclosed and claimed concept are provided by an improved method of indicating a need to replace an apparatus that is structured to energize a protective device to at least initiate an opening of at least a portion of a circuit. The general nature of the method can be stated as including storing energy in a storage device to enable a release of at least a portion of the energy to energize the protective device, detecting at least a first operational parameter of the storage device that is usable in determining an energy storage capability of the storage device and, responsive to a determination by the apparatus that the energy storage capability of the storage device has dropped to a predetermined threshold, performing a predetermined action.

BRIEF DESCRIPTION OF THE DRAWINGS

A further understanding of the disclosed and claimed concept can be understood from the Description when read in conjunction with the accompanying drawings in which:

FIG. 2 is a flowchart depicting certain aspects of the improved overload relay of FIG. 1; and FIG. 3 is another flowchart depicting other aspects of the improved overload relay of FIG. 1.

Similar numerals refer to similar parts throughout the specification.

DESCRIPTION

Figure 1:
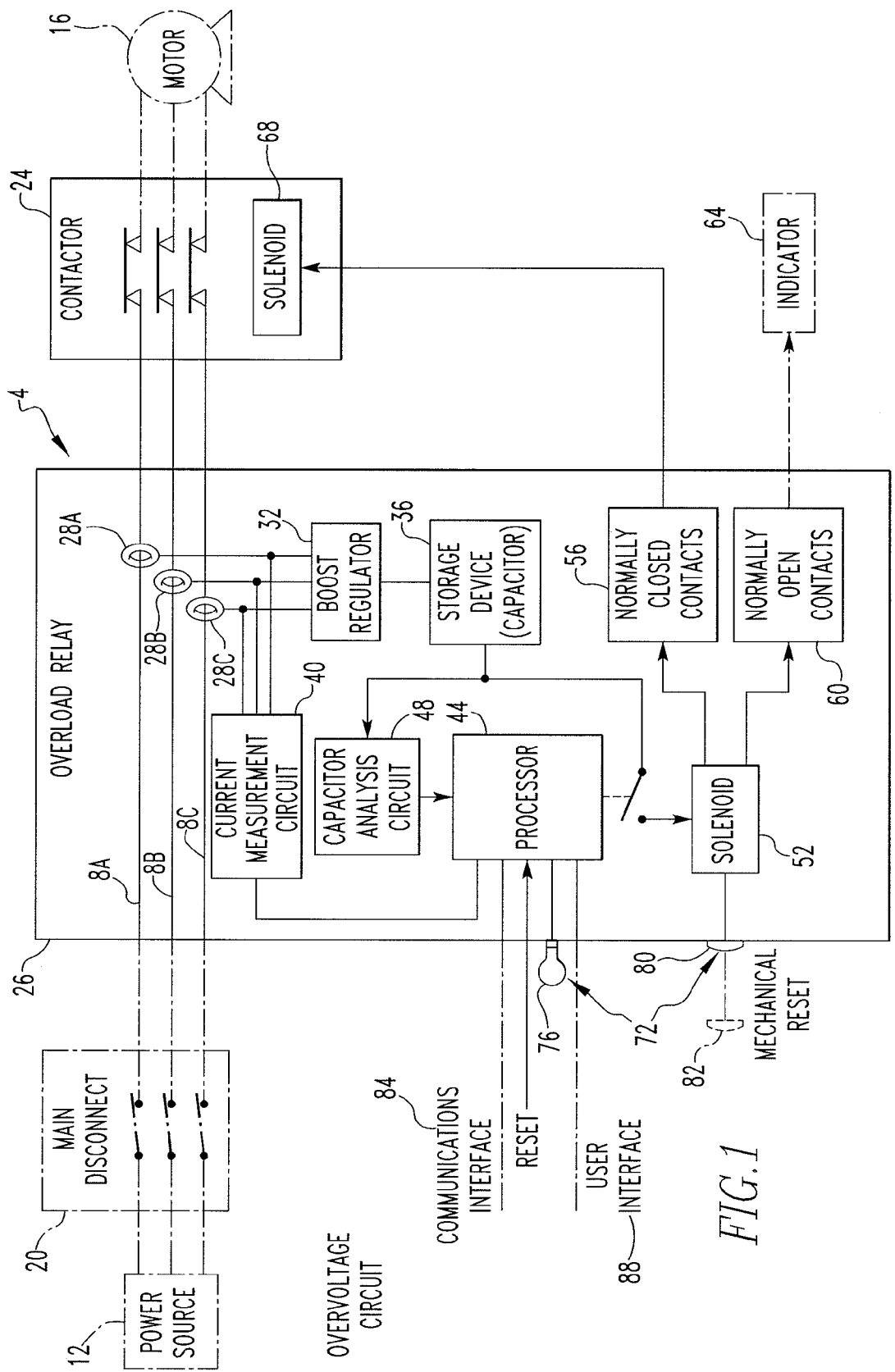
FIG. 1 is a schematic depiction of an improved overload relay and a circuit that it protects.

An improved overload relay 4 in accordance with the disclosed and claimed concept is depicted schematically in FIG. 1. The overload relay 4 monitors and controls a circuit that comprises three phases 8A, 8B, and 8C, collectively referred to hereinafter with the numeral 8, that extend between a power source 12 and a load 16 which, in the depicted exemplary embodiment, is an electric motor. The circuit also includes a main disconnect 20 that can be manually operated as well as a contactor apparatus 24 that is operated by the overload relay 4 to interrupt the circuit.

The overload relay 4 comprises a housing 26 upon which are disposed three current transformers 28A, 28B, and 28C, collectively referred to hereinafter with the numeral 28, which are used to monitor the current through the phases 8 and to power at least a portion of the overload relay 4. In powering the overload relay, the current that is drawn from the phases 8 by the current transformers 28 is delivered to a boost regulator 32 and then to a storage device which, in the exemplary embodiment herein, is in the form of an electrolytic capacitor 36. Current drawn from the phases 8 by the current transformers 28 is stored in the capacitor 36 which, in turn, powers various functions of the overload relay 4.

The current transformers 28 are additionally connected with a current measurement circuit 40 that is connected with a processor 44. The current measurement circuit 40 enables the processor 44 to monitor the current in the phases 8 and to take action in certain predetermined circumstances. The processor 44 has numerous algorithms incorporated thereon to evaluate the amount of current flowing through the phases 8 as a function of time and it is configured to interrupt the circuit when needed. For instance, the processor 44 might employ an algorithm whereby current is monitored over time as an indication of the temperature of the motor. If the current flowing through the circuit is at a sufficient level for a sufficient period of time, the processor 44 might determine that the load 16 is in danger of overheating and will determine that the circuit should be interrupted, by way of example.

Advantageously, the overload relay 4 further comprises a capacitor analysis circuit 48 which serves as a detection system to detect certain operational parameters of the capacitor 36, such as its voltage. While FIG. 1 schematically depicts the capacitor analysis circuit 48 as being interposed electrically between the capacitor 36 and the processor 44, it is understood that other connection arrangements can be employed without departing from the present concept. The operation of the capacitor analysis circuit 48 will be discussed in greater detail elsewhere herein.

The overload relay 4 further comprises a protective device in the form of a solenoid 52 which is of a latching type. In certain predefined circumstances, the processor 44 can cause the solenoid 52 to be energized by the capacitor 36 to toggle a set of normally CLOSED contacts 56 to an OPEN condition and to toggle a set of normally OPEN contacts 60 to a CLOSED condition. Since the solenoid 52 is of a latching type, a pulse of energy from the capacitor 36 causes the solenoid 52 to change states and thus to toggle the normally CLOSED contacts 56 and the normally OPEN contacts 60 to their OPEN and CLOSED alternate conditions, respectively, regardless of whether the energy from the capacitor 36 ceases. That is, another pulse of energy or a mechanical reset is required to cause the solenoid 52 to return to its original, i.e., normal condition and to toggle the normally CLOSED contacts 56 and the normally OPEN contacts 60 to their CLOSED and OPEN normal conditions, respectively.

When the solenoid 52 is energized and toggles the normally OPEN contacts 60 to their CLOSED condition, an indicator 64 is energized, and the indicator 64 can be in the form of a light, an alarm, etc. When the normally CLOSED contacts 56 are toggled by the solenoid 52 to their OPEN condition, it interrupts an operating current that had been flowing through the normally CLOSED contacts 56 to a solenoid 68 of the contactor apparatus 24, and such interruption of the operating current causes the solenoid 68 to change state and to operate the contactor, which interrupts the circuit to the load 16. The solenoid 68 is of a non-latching type, such that the interruption of operating current to the solenoid 68 due to the normally CLOSED contacts 56 being toggled to their OPEN condition causes the solenoid 68 to change states and interrupt the circuit.

The overload relay 4 further advantageously comprises an indictor which, in the exemplary embodiment depicted herein, is a visual indicator 72 that comprises an illumination source and a secondary, mechanical indicator. It is understood, however, that the visual indicator 72 could alternately or additionally include an audible indicator component without departing from the present concept. The illumination source is the exemplary embodiment depicted herein is an LED 76 that is powered by the capacitor 36 from current drawn from the circuit by the current transformers 28. The secondary indicator is in the form of an exemplary mechanical reset 80 which physically moves when the solenoid 52 changes state. That is, when the solenoid 52 is in a first state, the mechanical reset 80 is in a first physical position, as is depicted schematically in solid lines in FIG. 1. However, if the solenoid 52 is energized by the capacitor 36 and is caused to change state to a second state, the mechanical reset 80 physically moves to another position, as is indicated in dashed lines at the numeral 82, which can be visually ascertained by a technician.

The overload relay 4 further comprises a communications interface 84 and a user interface 88 connected with the processor 44 that enable interaction with the overload relay 4. For instance, the communications interface 84 can be used to communicate signals to a remote device such as a sensor or a computer device, by way of example. The user interface 88 can be used to connect with a remote computer device or other apparatus to enable a technician to interact with the overload relay 4 to operate the overload relay 4 or to receive data from the overload relay 4, or both, by way of example.

Advantageously, the LED 76 can provide visual indications of any of a plurality of statuses of the overload relay 4. For instance, since the LED 76 is self-powered, i.e., is powered by current drawn by the current transformers 28 from the phases 8 of the circuit, the LED 76 will be in an unilluminated condition, i.e., will be dark, during the initial charging of the capacitor 36. That is, the LED 76 will be unilluminated when the capacitor 36 has stored therein insufficient energy to energize the solenoid 52, which is one status of the overload relay 4.

Once the capacitor 36 has reached a desirable level of charge and has stored therein enough energy to reliably energize the solenoid 52, the LED 76 is caused to blink in a first predetermined fashion. For instance, the LED 76 can be caused to blink one time per second, by way of example, to indicate that the capacitor 36 is charged and that the overload relay 4 is functioning properly. This is another status of the overload relay 4.

Depending upon the output from the current measurement circuit 40, the processor 44 may cause the LED to blink in a second, predetermined fashion if a trip condition is imminent but has not yet occurred. By way of example, the LED 76 can be caused to blink twice per second, which would indicate still another status of the overload relay 4.

In the event that the capacitor 36 is caused by the processor 44 to energize the solenoid 52 and interrupt the circuit, the LED 76 likely will again be unilluminated since current is not flowing through the phases 8 and the capacitor 36 will have been substantially discharged from its energizing of the solenoid 52. However, since the mechanical reset 80 will move to its second position, as is indicated at the numeral 82, the second position of the mechanical reset 80 in combination with the LED 76 being in an unilluminated condition will indicate yet another status of the overload relay. In this regard, it is understood that an unilluminated condition of the LED 76 in combination with the mechanical reset 80 being in its first position (as is indicated at the numeral 80 in FIG. 1) is what typically will serve as the indication that the status of the overload relay 4 is that of being in an initial charging condition with the capacitor 36 being less than fully charged. It is also understood that the various statuses of the overload relay 4 can be communicated to another device via the communications interface 84.

Further advantageously, the capacitor analysis circuit 48 is operable to determine the energy storage capability of the capacitor 36 in order to generate an alarm or perform some type of predetermined action when the energy storage capability has dropped to a predetermined threshold. The predetermined threshold typically will be just above the amount of energy required to energize the solenoid 52. That is, the predetermined action is performed if the capacitor 36 reaches a condition where its ability to energize the solenoid 52 is potentially questionable.

The capacitor analysis circuit 48 can evaluate the energy storage capability of the capacitor 36 in any of a variety of fashions. For instance, the capacitor analysis circuit 48 may partially discharge the capacitor 36 and detect the voltage at one or more times during the at least partial discharging process. By way of further example, the capacitor analysis circuit 48 may cause the capacitor 36 to be charged at an energy storage level greater than that to which it is typically charged and may evaluate the degree to which the capacitor 36 maintains the extra charge by evaluating the voltage of the capacitor 36 as a function of time. Numerous other methodologies can be envisioned, such as those wherein evaluation of the capacitor 36 occurs without directly monitoring any of the characteristics of the capacitor 36. Rather, such an evaluation of the capacitor 36 could involve the evaluation of other factors such as the duration of time during which the capacitor 36 has been in service, the ambient temperature over time, the number of charge/discharge cycles of the capacitor 36, etc., by way of example.

Advantageously, if the capacitor 36 is determined to have an energy storage capability that has dropped to a predetermined threshold, the processor 44 can trigger a visual alarm, an audible alarm, or both, and/or can communicate a signal over the communications interface 84 to another device. Additionally or alternatively, the processor 44 can trigger the capacitor 36 to energize the solenoid 52 and interrupt the circuit. Furthermore, the LED 76 can be triggered to blink or be otherwise illuminated in still another fashion, such as to blink three times per second, by way of example. Other predetermined actions can be envisioned.

It is understood that the processor 44 or the capacitor analysis circuit 48 or both can be involved in the determination that the energy storage capability of the capacitor 36 has dropped to the predetermined threshold. It is also understood that other criteria can be employed in determining whether the capacitor 36 or the overload relay 4 itself should be replaced.

The predetermined action that is taken by the overload relay 4 in response to a determination that the energy storage capability of the capacitor 36 has dropped to a predetermined threshold can be interpreted in any of a variety of fashions. By way of example, the visual or audible alarm may indicate the need to replace the capacitor 36 or the overload relay 4 within ninety days or at the next scheduled maintenance cycle. Alternatively, the communications interface 84 may be employed to communicate to another device a message representative of a warning that the capacitor 36 or the overload relay 4 itself should be replaced within ninety days. Further advantageously, the processor 44 can receive input from the current measurement circuit 40 to provide a further indication that the capacitor 36 or the overload relay 4 itself should be replaced immediately. In such a scenario, the initial warning of replacement in ninety days may have been initially provided, but the temperature conditions of the load 16, and thus potentially the ambient conditions, may have been determined by the current measurement circuit 40 to be such that a more immediate replacement of the capacitor 36 or the overload relay 4 itself may be required.

The LED 76 is disposed on the housing 26 but can alternatively be disposed elsewhere or can be in the form of a plurality of LEDs disposed in various locations on and remote from the housing 26. Thus, a technician looking at the overload relay 4, and thus the housing 26, can advantageously ascertain a status of the overload relay 4.

An improved method of operating the overload relay 4 is depicted generally in FIG. 2. Energy is stored, as at 104, in a storage device such as the capacitor 36. An analysis operation is performed, as at 108, on the capacitor 36, with one or more operational parameters of the capacitor 36 being detected, as at 112. If, as at 116, it is determined that the energy storage capability of the capacitor 36 has dropped to a predetermined threshold, a predetermined action is performed, as at 120. As mentioned elsewhere herein, examples of such a predetermined action would include any one or more of the triggering of a visual alarm, the triggering of an audible alarm, the communicating of a signal over a communications interface to another device, and the energizing of a protective device such as the solenoid 52. Other predetermined actions will be apparent.

Another flowchart depicting other advantageous features of the overload relay 4 is depicted generally in FIG. 3. A visual indicator such as would include the LED 76 is self-powered, as at 204, such as by employing the current transformers 28 to draw current from the circuit that is being protected by the overload relay 4. At least a first visual indication is provided, as at 208, that is representative of a status of the overload relay 4. As mentioned elsewhere herein, the LED 76 can blink in any of a variety of fashions or can be unilluminated. When the LED 76 is unilluminated, the condition of the mechanical reset 80 can be used to determine whether the overload relay 4 is in an initial charging condition or whether it has already tripped. It is understood that the visual indications can be supplemented by further communications provided to an external device via the communications interface 84.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An apparatus structured to energize a protective device to at least initiate an opening of at least a portion of a circuit, the apparatus comprising:
   a storage device structured to store energy and to release at least a portion of the energy to energize the protective device;
   a detection system connected with the storage device and structured to detect at least a first operational parameter of the storage device that is usable in determining an energy storage capability of the storage device; and
   responsive to a determination by the apparatus that the energy storage capability of the storage device has dropped to a predetermined threshold, the apparatus being structured to perform a predetermined action.

2. The apparatus of claim 1 wherein the apparatus is structured to perform as the predetermined action a triggering of at least one of a visual alarm and an audible alarm.

3. The apparatus of claim 1 wherein the apparatus is structured to perform as the predetermined action an energizing of the protective device.

4. The apparatus of claim 1 wherein the apparatus is structured to perform as the predetermined action a communication over a communications interface of a signal that is representative of a need to replace at least a portion of the apparatus within a predetermined period of time.

5. The apparatus of claim 4 wherein the apparatus is structured to communicate over the communications interface another signal that is representative of a need to replace at least a portion of the apparatus immediately.

6. The apparatus of claim 1 wherein the storage device is a capacitor, and wherein the detection system is structured to detect as the at least first operational parameter a voltage of the capacitor.

7. The apparatus of claim 6 wherein the detection system is structured to at least partially discharge the capacitor, and wherein the detection system is structured to detect as the voltage of the capacitor a voltage of the capacitor at one or more times during the at least partial discharge of the capacitor.

8. A method of indicating a need to replace an apparatus that is structured to energize a protective device to at least initiate an opening of at least a portion of a circuit, the method comprising:
   storing energy in a storage device to enable a release of at least a portion of the energy to energize the protective device;
   detecting at least a first operational parameter of the storage device that is usable in determining an energy storage capability of the storage device; and
   responsive to a determination by the apparatus that the energy storage capability of the storage device has dropped to a predetermined threshold, performing a predetermined action.

9. The method of claim 8, further comprising performing as the predetermined action a triggering of at least one of a visual alarm and an audible alarm.

10. The method of claim 8, further comprising performing as the predetermined action an energizing of the protective device.

11. The method of claim 8, further comprising performing as the predetermined action a communication over a communications interface of a signal that is representative of a need to replace at least a portion of the apparatus within a predetermined period of time.

12. The method of claim 11, further comprising communicating over the communications interface another signal that is representative of a need to replace at least a portion of the apparatus immediately.

13. The method of claim 8 wherein the storage device is a capacitor, and further comprising detecting as the at least first operational parameter a voltage of the capacitor.

14. The method of claim 13, further comprising:
   at least partially discharging the capacitor; and
   detecting as the voltage of the capacitor a voltage of the capacitor at one or more times during the at least partial discharging.

* * * * *